United States Patent [19]

Cuff et al.

[11] Patent Number: 4,632,578
[45] Date of Patent: Dec. 30, 1986

[54] COMPUTERIZED PRINTING SYSTEM

[75] Inventors: William A. Cuff, Sylmar; Jerrold P. Lefler, Encino, both of Calif.

[73] Assignee: Digitext, Inc., Thousand Oaks, Calif.

[21] Appl. No.: 502,532

[22] Filed: Jun. 13, 1983

Related U.S. Application Data

[63] Continuation of Ser. No. 250,785, Apr. 3, 1981, abandoned.

[51] Int. Cl.⁴ .............................. B41J 3/26; B41J 3/516
[52] U.S. Cl. .......................................... 400/91; 400/63;
400/94; 400/77; 400/109; 364/900
[58] Field of Search ........................ 400/91, 94, 62-64,
400/77-79, 76, 98, 110, 109; 364/523, 200, 900

[56] References Cited

U.S. PATENT DOCUMENTS

| | | | |
|---|---|---|---|
| 3,234,363 | 2/1966 | Garth, Jr. et al. | 364/523 |
| 3,557,927 | 1/1971 | Wright et al. | 400/94 |
| 3,558,820 | 1/1971 | Baisch et al. | 400/94 |
| 3,597,538 | 8/1971 | Binenbaum | 400/94 |
| 3,665,115 | 5/1972 | Snook | 400/91 |
| 4,136,395 | 1/1979 | Kolpek et al. | 400/63 |
| 4,204,208 | 5/1980 | McCarthy | 364/900 |
| 4,257,711 | 3/1981 | Nakajima | 364/523 |
| 4,264,217 | 4/1981 | DeSieno | 400/63 |
| 4,342,085 | 7/1982 | Glickman et al. | 364/200 |
| 4,384,329 | 5/1983 | Rosenbaum et al. | 364/300 |
| 4,439,836 | 3/1984 | Yoshida | 364/900 |

OTHER PUBLICATIONS

Todd, "Abbreviated Typing for Word Processing", IBM Technical Disclosure Bulletin, vol. 21, No. 9, pp. 3796-3797, 2/79.

Forte et al, "Automation of Newspaper Graphics", Electronic Progress, vol. 18, No. 2, pp. 23-28, Summer 1976.

Primary Examiner—William Pieprz
Attorney, Agent, or Firm—Nilsson, Robbins, Dalgarn, Berliner, Carson & Wurst

[57] ABSTRACT

A computerized system for the rapid rendering of written or spoken material into printed text. A stenographic record of the material is produced by a reporter according to a stenographic system including "automatics" to enable batch translation of the stenographic data. The record thereby produced is translated rapidly and with a high degree of accuracy by a computer having a dictionary of the system stored in its memory. The translation is displayed upon the screen of an editing device for rapid editing by a word processing operator. The edited translation is applied to a transmitting modem. The modem encodes the edited translation for transmission to a remote computerized typesetter. The typesetter is directly programmed with the edited translation to produce a printed text of the material.

11 Claims, 4 Drawing Figures

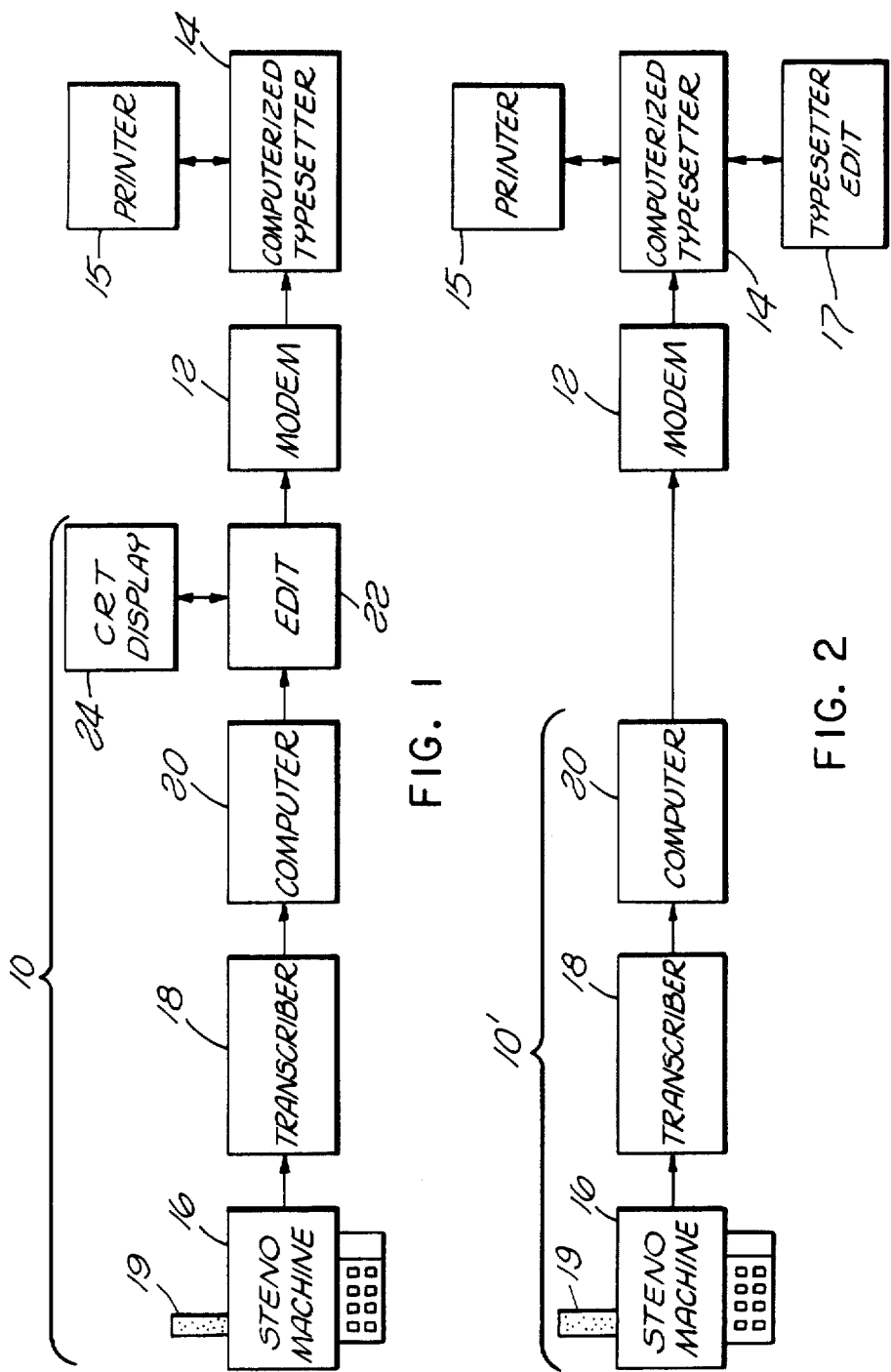

COMPUTERIZED PRINTING SYSTEM

This application is a continuation of U.S. patent application Ser. No. 250,785, filed Apr. 3, 1981, which application is now abandoned.

BACKGROUND AND SUMMARY OF THE INVENTION

The present invention pertains to printing and typesetting methods. More particularly, it pertains to systems and methods for producing an input for a computerized typesetter from original written or spoken text.

Traditional printing requires substantial time and effort on the part of the typesetter. With the advent of computerized typesetting, the input of text still remains a considerable hindrance to the efficient usage of this otherwise-efficient equipment. Even greater inefficiencies are encountered when one seeks to print material which is not reduced to a manageable form for the typesetter, manual, computerized, or other. This occurs, for example, when one wishes to print the content of a speech as delivered or other verbal proceedings such as commonly occur in legal processes.

The present invention addresses these and other shortcomings of present-day printing by providing an improved method for rendering written and spoken material into printed text. The method includes the production of a computer-readable record of the material. This record is then applied to a modem whereby the record is encoded for operating a computerized typesetter. The encoded record is then transmitted to a computerized typesetter which is associated with a printer so that the type of the printer is set in accordance with the encoded record. The printer is then operated in a conventional manner to produce the desired printed text.

In a further aspect, there is disclosed a method for operating a computerized typesetter. The method includes the step of producing a computer-readable record of material. The record is then applied to a modem whereby it is encoded for the operation of a computerized typesetter. Finally the typesetter encoded record is transmitted to a computerized typesetter associated with a printer so that the type of the printer is set in accordance with the encoded transmission.

In yet a further aspect, the invention embraces a method for rapidly producing a substantially error-free shorthand transcription of written and spoken material. The method includes storing a shorthand dictionary in a computer. A shorthand record is made in conformance with the system defined in the dictionary. The shorthand record is then converted into computer-readable form and applied as input to the computer so that there is produced a translation of the shorthand record.

In its final aspect, the invention comprises a novel printing system. The system incorporates means for producing a computer-readable record of spoken and written materials. A modem is provided for converting the record to typesetting instructions and a computerized typesetter additionally provided which is responsive to the instructions. Finally, a printer, responsive to the typesetter, is engaged thereto.

These and other aspects and advantages of the present invention are set forth in the following detailed description wherein like numerals represent like elements throughout.

BRIEF DESCRIPTION OF THE DRAWINGS

FIG. 1 is a block diagram of apparatus incorporating the system and method of the present invention;

FIG. 2 is a block diagram of an alternative embodiment of a system according to the present invention;

DETAILED DESCRIPTION

Figure 3A:
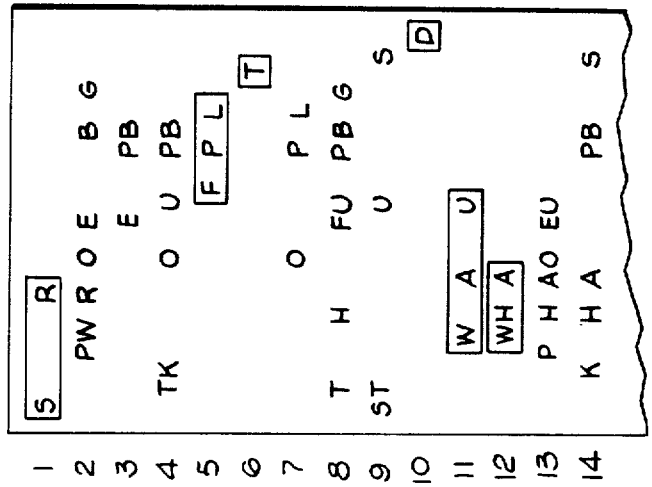
FIGS. 3(a) and 3(b) are a sample of a stenographic tape prepared according to the applicants' unambiguous shorthand system and a related diagram of the computerized translation scheme utilized therefor, respectively. Boxes surrounding certain of the shorthand strokes indicate the unique "automatics" incorporated in the shorthand system which allow the rapid computerized translation of shorthand data thereby.

Turning to the drawings, FIG. 1 is a block diagram of the computerized printing system of the invention. The system generally comprises three major groups, a transcription center 10, a modem 12, and a computerized typesetting machine 14 including an associated printer 15. The transcription center 10 provides an edited, computer-encoded text in the form, for example, of binary data stored in an appropriate medium such as magnetic tape, floppy disc or the like.

The edited, computer-encoded text prepared at the transcribing center 10 is transformed by the modem 12 into a format for addressing the computerized typesetter 14 so that the type of the printer 15 is set to conform to the transmitted text. Alternatively, the invention may be practiced without the use of a transmitter modem in the event a computer is utilized having both typesetting and translation capabilities. In such a way, the information transmitted by the modem 12 may program or set the type of the printer 15 without the aid of a typesetter operator or editor. Rather the modem 12 "talks" to the printer 15 through the typesetter 14, directing its operation from a remote location. An appropriate modem 12 for transmission of the computer-encoded text to the computerized typesetter 14 is the VA 3451 by the Racal-Vadic Company of Sunnyvale, Calif. This modem encodes data in the ASKII code which is universally accepted for the operation of a computerized typesetter according to the above-described mode of operation.

In an alternative embodiment of the invention, shown in FIG. 2, the editing function is undertaken at the computerized typesetter 14 by the operating personnel at typesetter edit means 17. The editing function within the transcription center 10 is, in effect, transferred to the operator of the computerized typesetter 14. This variation is rendered feasible by the novel shorthand system of the present invention. This system, when utilized by the shorthand reporter, produces a first draft in shorthand which is designed for accurate and rapid decoding (translation) by a computer. Thus, the (manual) editing function in either embodiment requires minimal effort.

Referring in detail to the elements of the transcription center 10 of FIG. 1, it includes a stenograph machine 16 for generating a series of shorthand "strokes" which are recorded upon a paper tape 19 and, at the same time, applied to a transcriber 18. In accordance with the present invention, an operator manipulates the keys of the stenograph machine 16 in accordance with the shorthand system of the invention. The production of a stenographic record of particular compatibility with computerized translation minimizes the amount of operator editing time which otherwise degrades the overall speed and efficiency of the printing system. This is to be contrasted with present-day computerized systems, including conventional shorthand inputs that rely on the purely phonetic rules of present-day stenography, which require substantial manual editing and computer search time.

A widely used shorthand machine 16 which may be adapted to the invention has a keyboard of twenty-two phonetically related characters. The record produced by the machine is a paper tape 19 on which the phonetic characters are printed. To record a word or parts of a word, the operator presses an appropriate combination of keys and the machine prints the characters simultaneously on the paper tape 19 which is advanced one interval before each combination is recorded. A general description of this type of machine is given in U.S. Pat. No. 2,319,273 entitled "Stenographic Machine", issued to J. G. Sterling. Such a machine is commercially available from the Stenograph Corporation of Skokie, Ill.

The machine-readable output of the transcriber 18 is applied to a digital computer 20. The computer 20 includes in its memory a dictionary which defines the system of stenography employed herein. The system employed in the invention for translating the output of the transcriber 18 is disclosed in further detail with reference to FIGS. 3(a) and 3(b) and the accompanying discussion. It will suffice to say at this point that, as a beneficial result of the particular system of stenography utilized, the translating computer 20 is enabled to perform an efficient search which yields a relatively error-free "rough" translation of the operator's strokes. Thus, the production of an input for the computerized typesetter 14 is doubly enhanced: in the first instance, a simplified and consequently speedy computer translation scheme is available as a result of the stenographic system employed which includes the use of "automatics" that rapidly locate certain unambiguous words and phrases and the efficiently produced translation is substantially error-free as a result of the reduction of ambiguities so that manual editing time is minimized.

The digital computer 20 produces the translation in computer-encoded format on a tape, disc or the like. The translation is applied to an editing machine 22 which preferably includes a CRT display 24 to enable the operator to perform the editing function with the aid of a pointer or like editing scheme. A VT 100 editing terminal manufactured by the Digital Electronics Corporation of Maynard, Mass., provides a satisfactory machine 22 and associated CRT screen 24 for purposes of the present invention.

The editing machine 22 presents the translated data, in decoded form, upon the CRT screen 24 to enable the operator to make necessary corrections. The corrections, made by depressing the keys of a standard typewriter keyboard associated with the machine 22, are entered in machine-readable, binary form on the output produced by the computer 20. Thus, after editing, a machine-readable (computer-encoded) edited text is prepared for application to the modem 12.

As above-mentioned, an alternative embodiment of this invention is shown in FIG. 2. In this figure, components corresponding to the components of FIG. 1 are given identical numerals. A typesetting editing means 17 is associated with the computerized typesetter 14. This eliminates the need for the editing machine 22 and associated CRT display 24 within the transcription center 10. As above-referenced, the small number of errors in the text produced by computerized translation of the stenographic strokes reduces the editing of text to a relatively minor task which might equally be performed by the operator of the computerized typesetter 14.

While the overall systems of FIGS. 1 and 2 are unique to the printing and typesetting arts, their performances are greatly enhanced in terms of speed and efficiency by the usage of a novel shorthand system therewith. The shorthand system is employed by the operator as he or she records data by manipulating the keys of the steno machine 16.

A dictionary defines the system which is entered into the memory of the computer 20 by means and methods well-known in the computer arts. This dictionary and associated shorthand system enable the invention herein to be practiced in its best mode.

The system includes about 500 single stroke parameters or "automatics" for the most common words, prefixes, suffixes phrases and punctuation. A parameter may be defined as a single shorthand stroke which is given an unambiguous meaning within the system. That is, the stroke can have only one translation (for example a word or a phrase) and its components do not comprise portions of other words. This varies from conventional shorthand systems which are purely phonetic. In such systems, the reporter records strokes corresponding to the sound of a word or phrase. Thus, although standard symbols may be employed for the syllables, the concept of an automatic does not exist—all words being formed as a combination of phonetic sounds. A broad latitude therefore exists which is a function partially of the "ear" of the reporter and the presence of homonyms in the text. (Applicants' system provides distinct strokes (parameters) for all common homonyms.) As a result of its purely phonetic nature, a rather cumbersome brute-force method of computer searching is generally employed in present-day computerized transcription systems involving the repeated scanning of an entire dictionary. The text thereby translated generally requires substantial editing effort.

A brief illustration, by way of example, of the computerized translation of text prepared according to applicant's shorthand system follows. It is to be understood that the programming of the computer 20 in accordance with the method described is well known in the art, the novelty and advantages, such as enhanced speed and accuracy of translation, deriving from the design of the shorthand system.

FIG. 3(a) is a segment of tape of a stenographic record taken by a reporter according to the shorthand system. The tape contains fourteen shorthand strokes which record the following sentence fragments: "have broken down. The only thing discussed was what my chance".

Figure 3B:
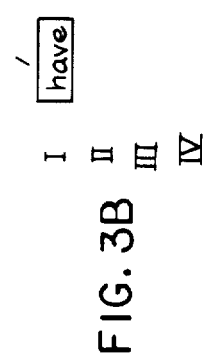

The strokes of lines 1, 5, 6, 10, 11 and 12, which are enclosed in rectangular boxes, are "automatics" of the shorthand system as discussed above, the translations of which are listed in FIG. 3(b) at line Roman numeral I. These "automatics" were identified in the computer's initial scanning of the input encoded shorthand data against the system "automatics" stored in the memory of the computer 20.

Most automatics define a complete word or phrase, to thereby serve as a pointer with regard to the location of the beginning of the succeeding word. Hence, the incorporation of a shorthand system utilizing the "automatic" concept greatly enhances the speed of translation by quickly locating the beginnings of hundreds or thousands of words depending upon the length of text.

In the event the "automatic" is only the root of a word, the translation of the succeeding strokes will be undefined by the dictionary stored in the memory of the computer 20. The computer will then scan for suffixes and the like, finish the word begun by the automatic and use the automatic-plus-suffix as a new pointer to locate the beginning of the next word.

Returning to the tape segment of FIG. 3(c), the computerized translation of the shorthand segment now proceeds to a second level. Each identified "automatic", serving as a pointer, next locates the immediately following (non-parameter) stroke. Thus, the strokes PWROEBG (line 2), OPL (line 7) and PHAEU (line 13) are located for processing or translation at a second level of computer analysis.

The aforesaid non-parametric strokes are first alphabetized. Taking the first shorthand letter of each stroke yields a B(PW), an 0 and an M (PH). The three strokes (lines 2, 3 and 4) between the parameters SR and FPL are thus entered into a B register, the strokes of lines 7, 8 and 9 entered into an 0 register and the strokes of lines 13 and 14 entered into an M register.

Once the entire transcript has been sorted, each series of strokes between parameters is translated by being matched with the alphabetized dictionary definitions. For example, the strokes PWROEBG, EPB and TKOUPB are matched with "B" definitions to translate the strokes PWROEBG and EPB into the word "broken." Because the succeeding stroke TKOUPB following these strokes does not create another word, this stroke remains untranslated. In FIG. 3(b), line Roman numeral II indicates that the words "broken", "only" and "my" have been translated in the above manner from the strokes of lines 2, 3, 7 and 13 of the tape.

The mode of translation of non-parameter strokes discussed above is common to present-day computerized transcription systems. It varies from and is superior to such systems in that (1) the use of automatics allows the computer to locate the beginnings of hundreds or thousands of words and (2) the alphabetical sorting of strokes between pointers allows the batch processing of the data. These two points are, of course, interrelated, as the alphabetizing for batch processing purposes could not occur without the reliable location of word beginnings by the use of "automatics".

A third level of translation now occurs. At this level, the words translated at level II act as pointers. Thus, new word beginnings occur at the ends of the words above-translated. Using the same procedure as described above, the stroke TKOUPB, which starts with the steno letter D (TK), is sorted into the "D" file. The strokes THEPB and STUS are sorted into the "T" file. The stroke KHAPBS is sorted into the "C" file. After re-sorting the remaining strokes then batch-translating, the strokes of lines 4 and 8 are translated at level III. A further iteration as above, with the stroke of line 8 acting as pointer, translates the stroke of line 9, completing the translation of the entire segment.

Applicants have found that the use of a shorthand system as described above in conjunction with the aforesaid scheme of computerized translation, which avoids the time consuming serial processing of raw data, has resulted in a measured ninety-fold increase in output (36,000 pages per minute as opposed to 400 pages per minute by conventional computerized translation). The incorporation of such a shorthand system into the invention herein thus greatly increases its practicability and usefulness in the printing and related arts.

Thus, it is seen that there has been brought to the printing and typesetting arts a new and powerful method and apparatus for the rapid rendering of both written and spoken material into print.

What is claimed is:

1. A method of translating a plurality of shorthand strokes, representative of written and spoken material, into text, the shorthand strokes being generated according to a preselected shorthand system, the method of translating comprising the steps of:

(a) storing a dictionary of a preselected shorthand system in a computer, the dictionary including text definitions for a predefined set of shorthand strokes;

(b) then producing a computer readable record of the shorthand stroke representations of said material in accordance with said preselected shorthand system, the preselected shorthand system including means for locating at least one first level pointer in the record, each first level pointer having an unambiguous definition in said dictionary;

(c) then applying the computer readable record to the computer for translating said shorthand strokes, the step of applying the record to the computer comprising the steps of:

(1) comparing the record against the dictionary to identify at least one portion of the record whose translation to text is a first level pointer;

(2) starting with the stroke immediately following the identified first level pointer, successively combining strokes and comparing each combination against the dictionary for locating the longest unambiguous match, the longest located unambiguous match defining a translatable portion of the record and further defining a next level pointer; and (3) repeating step (2) using each next level pointer in place of said first level pointer until said record is substantially translated.

2. The method of claim 1 wherein the step of storing further comprises the step of predefining a selected set of single strokes recorded in the computer readable record as absolutes, said absolutes having an unambiguous text translation, said absolutes being defined as said first level pointers.

3. The method of claim 2 wherein the first substep of comparing the record against the dictionary comprises the step of identifying the absolutes in the computer readable record for defining said first level pointers, and wherein said second step of combining strokes and comparing comprises:

locating the first sequence of one or more non-absolute shorthand strokes in the computer readable record following each first level pointer, which has an and unambiguous match with the dictionary, each such match defining the next level pointers, and wherein each third step of repeating further comprises:

repeating step (2) for each defined next level pointer in place of said first level pointer until comparison between non-absolute shorthand strokes in the computer readable record and the dictionary results in the definition of no further pointers, each pointer defining a portion of the computer readable record having a unique text translation.

4. A method as defined in claim 3 wherein the step of transmitting the encoded record to a computerized typesetter further includes the step of editing said encoded record.

5. The method of claim 2 or 3 further comprising:
   (a) applying the record to a modem so that said record is encoded for operating a computerized typesetter: then
   (b) transmitting said encoded record to a computerized typesetter associated with a printer so that the type of the printer is set in accordance with the encoded record.

6. A method as defined in claim 1 wherein the step of producing a computer-readable record further comprises the steps of:
   (a) making a shorthand record of the material according to said preselected shorthand system; then
   (b) transforming said shorthand record to a computer-readable output; then
   (c) applying said output to the computer to translate said output.

7. A method as defined in claim 6 wherein the step of producing a computer-readable record additionally includes the steps of:
   (a) applying said output to editing apparatus; and
   (b) operating said editing apparatus to produce an edited version of said output.

8. The method for translating a plurality of shorthand strokes, generated according to a preselected shorthand system, to text, comprising the steps of:
   (a) storing a dictionary of a preselected shorthand system in a computer, said shorthand system comprising the utilization of distinct parameter strokes to represent each homonym, thereby distinguishing a desired word from its homonym, and distinct parameter strokes to represent prefixes and suffixes, so that said distinct parameter strokes have an unambiguous text translation, at least some of the distinct parameter strokes being predefined as pointers;
   (b) then producing a computer readable record in accordance with said preselected shorthand system;
   (c) then applying the computer readable record to the computer for translating such shorthand strokes of said record, the step of applying the record to the computer comprising the steps of:
      (1) comparing the record against the dictionary to identify portions of the record corresponding to said predefined pointers to thereby locate the predefined pointers in the record;
      (2) using the located pointers in the record to locate beginnings of words not represented by distinct parameter strokes, said word beginnings being defined to be the portion of the record immediately following the location of the located pointers;
      (3) comparing a selected sequence of shorthand strokes starting with the first shorthand stroke immediately following the pointer, against the dictionary for locating an unambiguous match, the first located unambiguous match defining a translatable portion of the record and further defining a next pointer; and
      (4) repeating steps (2) and (3) for each pointer so defined which has an untranslated portion of the record which follows immediately thereafter to define additional pointers until all of said pointers have been located and defined.

9. The method of claim 8 further comprising the steps of:
   applying the record to a modem so that said record is encoded for operating a computerized typersetter; then
   transmitting said encoded record to a computerized typesetter associated with a printer so that the type of the printer is set in accordance with the encoded record.

10. A method as defined in claim 8 wherein the step of producing a computer-readable record further comprises the steps of:
   (a) making a shorthand record of the material according to said preselected shorthand system; then
   (b) transforming said shorthand record to a computer-readable output; then
   (c) applying said output to the computer to translate said output.

11. A method as defined in claim 10 wherein the step of producing a computer-readable record additionally includes the steps of:
   (a) applying said output to editing apparatus; and
   (b) operating said editing apparatus to produce an edited version of said output.

* * * * *